Nov. 20, 1951  J. M. KISSELLE  2,576,019
CIGARETTE TRAY
Filed July 16, 1948

INVENTORS
JOHN M. KISSELLE
BY Barnes, Kisselle, Laughlin & Raisch
Attorneys

Patented Nov. 20, 1951

2,576,019

UNITED STATES PATENT OFFICE 2,576,019

CIGARETTE TRAY

John M. Kisselle, Detroit, Mich.

Application July 16, 1948, Serial No. 39,031

5 Claims. (Cl. 206—19.5)

This invention relates to a cigarette tray and has particularly to do with a tray to be used on a moving vehicle.

This application is a continuation-in-part of my copending application Serial No. 566,654, filed December 5, 1944, now abandoned, which application is a division of Patent No. 2,364,078, dated December 5, 1944.

It is an object of the present invention to provide an ash tray which may be used in combination with the "no-draft" ventilation window common on vehicles today. This "no-draft" ventilation window is the type which is pivoted on a substantially vertical axis so that the rear portion may be swung outwardly and the front portion swung inwardly. The ventilating feature of this window resides in the fact that the air enters the aperture formed at the forward end thereof and passes out the aperture formed at the rear end thereof when opened.

Another object of the present invention is to provide an ash tray which may be utilized in connection with a "no-draft" window whereby the ventilating features of the window can be used to advantage in removing ashes from the tray and the vehicle.

It is a further object of the invention to provide an ash tray which may be adapted to present day window construction or an ash tray which may be specially constructed in connection with the window to serve as an original fitting.

Other objects and features of the invention, having to do with details of construction and operation, will be set forth in the following description and claims.

Figure 1:
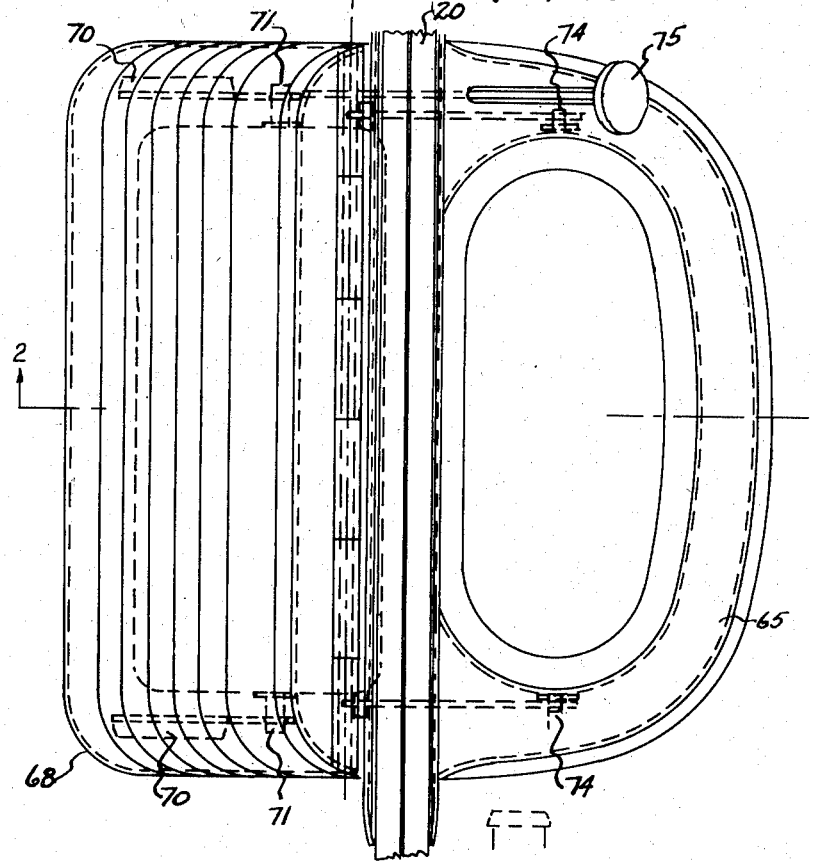
Fig. 1 is a form of ash tray adapted to be inserted in an opening formed in the "no-draft" ventilator window.
Figure 2:
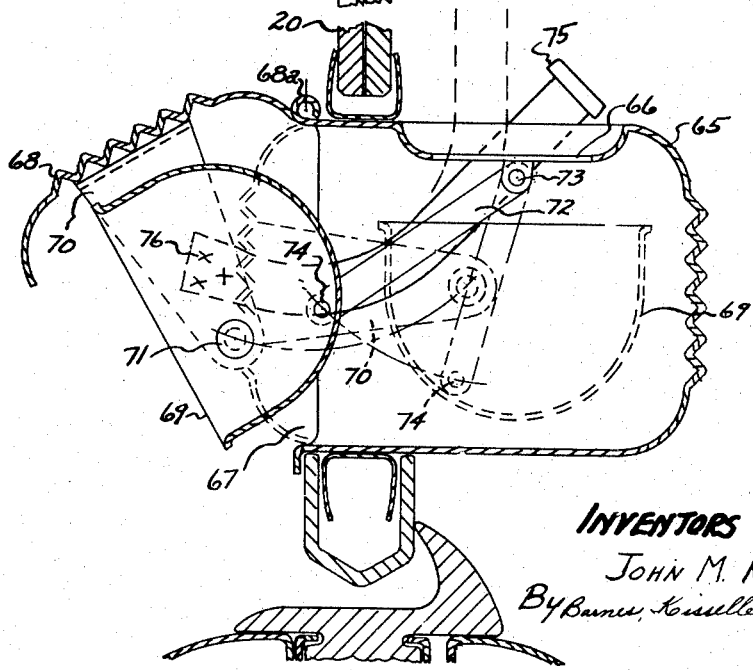
Fig. 2 is a transverse section taken on lines 2—2 of Fig. 1.

In the form of the invention illustrated in Figs. 1 and 2, the ash tray may be mounted at substantially the same point on a "no-draft" window 20 as shown in Fig. 1 of Patent No. 2,364,078, but a hole or opening is made in the glass so that the housing of the ash tray extends through the opening to the outside of the car. An elongated housing 65 is shaped with an oval opening 66 at the top and an opening 67 at the outside. This opening 67 is to be closed by a flap or shield 68 hinged at its top edge 68a. A tray 69 is mounted on the housing and on the shield as follows: The shield has inward extensions 70 to which the tray is pivoted at 71. These extensions are at each end of the shield. Links 72 are pivoted at 73 at each end of the housing and pivoted at 74 at each end of the tray. There is, therefore, a two-point suspension for each end of the tray 69. A push lever 75 is spot-welded at 76 to one of the extensions 70 and extends upwardly through a slot at one end of the housing. When force is applied to this lever the shield 68 is forced open and since the pivotal points 71 are moved, the tray or receptacle 69 will shift to a dumping position, as shown in Figs. 1 and 2. Suitable means, including the weight of the shield 68 can be provided to return the parts to their resting position shown in dotted lines in Fig. 2.

It will be seen that the tray 69 can be dumped when the window panel 20 is either opened or closed. If dumped when the window is closed, the air passing the car will carry the ashes away. If dumped when open, the air on the outside of the window in combination with the air passing out of the rear opening of the window, will carry the ashes downward and away from the car. It will also be noted that with the shield 68 opened and tray 69 shifted to the dumping position, an air passage is formed which communicates with the interior of the vehicle through opening 66 and facilitates the passage of a natural draft from within the vehicle around the upper edges of tray 69 and out opening 67.

What I claim is:

1. In a vehicle, a window panel including a transparent pane, a frame surrounding such pane, a housing mounted on said frame and having an opening at each side of said panel, an ash receptacle mounted in said housing and arranged to pass through an opening in the window panel to dump its contents, a member normally closing the opening in said housing on the outer side of the panel, and means operable in response to the movement of said ash receptacle to actuate said closure member so that the opening on the outer side of the panel is closed when the receptacle is in an ash receiving position and opened when the receptacle is in a dumping position to provide a passageway through the housing communicating with the opening on the inner side of the panel.

2. In a vehicle, a movable window panel including a transparent pane, a frame surounding such pane, a housing mounted on said frame and having an opening at each side of said panel, an ash receptacle mounted in said housing to move with the window panel and arranged to pass through an opening in the window panel to dump its contents, said receptacle being arranged to receive ashes through the opening in said housing on the inside of said panel and dump them exteriorly of the vehicle through the opening in said housing on the outside of said panel, means normally closing the opening in the housing on the outer side of the panel, and means operable to shift said closing means to an open position when said receptacle is shifted to the dumping position.

3. In a vehicle, a window panel at one side of the vehicle movable around a substantially vertical axis and including a transparent pane, a frame surrounding such pane, a housing mounted on said frame adjacent the lower rear corner of said panel, an ash receptacle mounted in said housing and arranged to pass through an opening in the window panel to dump its contents, said housing having an opening coinciding with the opening in the window panel and a second opening above said tray on the inner side of said panel, and means to close the first mentioned opening in the housing when said tray is disposed so as to receive ashes through the second opening in said housing.

4. In a vehicle, a transparent window pane, an aperture formed in said pane, a housing mounted within said aperture and having a pair of openings, one of the openings communicating with the inside of the vehicle and the other with the outside, an ash receptacle mounted in said housing and adapted to receive ashes from within the vehicle through said inside opening in said housing, and means operable from within the vehicle for actuating said receptacle, said last-mentioned means including link members pivotally connected with said receptacle and said housing, said ash receptacle having its upper end open, said links normally supporting said receptacle in an upright position with the open end thereof registering with said inside opening and being actuatable to swing said receptacle through said aperture to a discharging position where said open end projects outwardly through said outside opening.

5. In a vehicle, a window panel at one side of the vehicle movable around a substantially vertical axis intermediate the front and rear edges of the panel so that the portion of the panel spaced forwardly of said axis is permitted to swing inwardly of the vehicle and the portion of said panel spaced rearwardly of said axis is permitted to swing outwardly of the vehicle, said panel having an opening therein adjacent the lower edge of the panel and disposed rearwardly of said vertical axis, a housing mounted on said panel in said opening, said housing having an inlet opening on the inner side of said panel and an outlet opening on the outer side of said panel, an ash receptacle mounted in said housing and movable with said housing and the rear portion of said panel in a direction outwardly of the vehicle about said vertical axis, said ash receptacle being movably supported in said housing for movement from a position juxtaposed to said inlet opening to a position wherein at least a portion of said receptacle projects outwardly through said outlet opening in said housing to dump the contents thereof exteriorly of the vehicle, and means operably connected with said receptacle and said housing and operable when actuated to shift said receptacle from one of said positions to the other position.

JOHN M. KISSELLE.

REFERENCES CITED

The following references are of record in the file of this patent:

UNITED STATES PATENTS

| Number | Name | Date |
| --- | --- | --- |
| 686,954 | Riley | Nov. 19, 1901 |
| 2,377,713 | Penney at al. | June 5, 1945 |

FOREIGN PATENTS

| Number | Country | Date |
| --- | --- | --- |
| 705,770 | France | June 12, 1931 |